Patented July 13, 1954

2,683,706

UNITED STATES PATENT OFFICE 2,683,706

METHOD FOR THE PREPARATION OF FUSIBLE LIGNIN RESINS

Hans Friedrich Müller, Bregenz, Austria, assignor to Institut International Financier of Eschen, Liechtenstein No Drawing. Application May 31, 1950,
Serial No. 165,359

16 Claims. (Cl. 260—124)

The present invention relates to a novel and particularly advantageous method for the preparation of fusible lignin resins from lignin, i. e. lignin-containing raw materials, such as wood-hydrolysis lignin, lignin-sulphonic acid, sulphite waste liquor, peat, lignite and the like.

Lignin is produced in the form of wood-hydrolysis lignin and in the waste liquors of cellulose works in vast quantities every year, and no means have so far been found by which this raw material might be utilized in a satisfactory manner. Sulphite cellulose waste liquor, however, is in part used for the production of tannins and vanillin, and sulphate-liquor lignin for moulded plates, but these processes utilize only a fraction of the available lignin. Wood-hydrolysis lignin is not utilized at all.

The greatest obstacle to satisfactory utilization of lignin is that the latter is formed in different states in different processes. Thus the lignin of sulphite cellulose waste liquors is soluble in water, sulphate liquor lignin is soluble in alkalis, whilst wood-hydrolysis lignin is completely insoluble. Accordingly, it has been endeavoured to provide special utilization processes for every type of lignin so that a vast number of different utilization methods are known today. Profitable industrial utilization of lignin will, however, only be possible if ways and means are found of utilizing the different lignins on the basis of uniform processes. In this respect the waste liquors of sulphite cellulose manufacture and wood-hydrolysis lignins must be considered primarily. The problem of the utilization of sulphate lignin is not so acute since such lignin is not separated in the decomposition process.

It is a common characteristic of all lignins that they consist of mixtures of high-molecular-weight materials which are transformed into resinous bodies under the influence of hydrolyzing reagents. In this respect many processes have been suggested employing phenols, or alkali hydroxides, or other suitable substances and endeavouring to determine the conditions most favourable for the individual lignin under consideration. However, no process has hitherto become known in which all possible lignins or even lignin mixtures can be worked into resins by means of one process.

With the method according to the present invention, however, it is now possible to produce fusible lignin resins from wood-hydrolysis lignin, lignin-sulphonic acid, sulphite cellulose waste liquor, peat, lignite and other lignin-containing raw materials, said resins being eminently suited to a great variety of uses.

According to the invention this is achieved by first subjecting the raw materials to an alkali hydroxide treatment which is known as such, said treatment being performed in such a manner that the raw materials are mixed with the alkali hydroxide solution, dried therewith, and heated to temperatures above 100° centigrade at least towards the end of the drying period. The dry material is then dissolved in water and the lignin resin precipitated from this fluid by acidification.

It is a particular characteristic of this method, and one constituting considerable advantages, that mixtures of the lignin-containing raw materials may be used, such as a mixture of wood-hydrolysis lignin and lignin-sulphonic acid, preferably in the proportion of 1:5 to 1:10. It is also possible to use an alkali hydroxide dissolved in sulphite cellulose waste liquor as alkali hydroxide solution, which, possibly after concentration, is mixed with insoluble lignin or lignin-containing raw material.

It may further be advantageous to add to the alkaline solution other non-volatile alkaline agents, such as alkali carbonate, alkaline earth oxides and the like in addition to or in partial substitution for, the alkali hydroxide. On the other hand, lignin-solvent materials, such as phenols, amines, monovalent or polyvalent alcohols or the like may be added to the alkaline solution.

Furthermore, it is important to keep the quantities of alkali hydroxide and the heating temperatures in the decomposition process within such limits that on the one hand the lignin is obtained in a state in which it is completely precipitable and fusible at least in boiling water, and that on the other hand no decomposition occurs which would be detrimental to the precipitability of the lignin.

In order to ensure uniform decomposition of the lignin it is advisable in this process to effect drying while the material is being mechanically kneaded and crushed. The drying process may further be effected in stages, the temperature rising from step to step, while a vacuum may be applied in the first stage or stages. It is advisable when dissolving the dried material obtained after alkaline treatment, to use the minimum quantity of water required therefor.

The alkaline decomposition solution may be precipitated by means of strong mineral acids, the liquid remaining after precipitation being used entirely or partly for dissolving the dried material, possibly after separation of the precipitated salts.

The alkaline decomposition liquid may, moreover, be precipitated by means of weak or medium acids such as carbonic acid or sulphurous acid, the precipitated lignin being treated with a strong mineral acid subsequent to its separation from the solution. The precipitation is in such cases preferably effected at temperatures ensuring that the lignin is precipitated in a fused state.

The liquid remaining after precipitation of the lignin with weak or medium acids may be added to another decomposition batch after causticization with calcium oxide and separation of the lime precipitate. The waste liquor produced after precipitation of the lignin may be treated, if necessary after several repetitions of its use for dissolving the alkali treated lignin product, by means of concentrated mineral acids. Also the lignin remaining in the waste liquor may be precipitated only subsequent to crystallization and separation of the alkali salts.

The liquor remaining after precipitation of the lignin by means of weak or medium acids may, on the other hand, also be causticized with calcium oxide after evaporation of water and roasting off of the organic substances, and added to a new decomposition batch after separation of the lime precipitate. Alternatively, the solution remaining after precipitation of the lignin may be added to a new decomposition batch after causticization of the alkali salts and the remaining liquor obtained after precipitation of the lignin may be roasted, causticized and added to a new decomposition batch after filtering, possibly only after several repetitions of the liquor recovery.

When moist, the lignin precipitated by means of acid, or parts of said lignin, may be mixed, possibly with lignin-dissolving materials, such as monovalent or polyvalent alcohols, esters, ethers, ketones or the like, or condensible plastic components, such as phenols, amines, amides, aldehydes, ketones or the like, or with plastics produced by condensation or mixtures of such substances.

The acid-precipitated fusible ligin resin may, after addition of alkaline agents, be used in known manner in the manufacture of moulding compounds, ply-wood, laminated wood, fibre plates, chip plates or the like, if necessary after mixing with lignin-solving or condensable plastic components, or plastics produced by condensation, or mixtures of such materials, said lignin being used for said purposes either alone, in solution, suspension, or in the form of a glue film or powder as a heat-hardenable binding agent. Alternatively it may be preferred to add the acid-precipitated fusible lignin resin in its moist state to acid-hardening plastics, if necessary with the addition of lignin-dissolving materials or condensable plastic components or mixtures of such materials, for use in the known manner as a heat-hardenable binding agent in the manufacture of moulding compounds, ply-wood, laminated wood, fibre plates, chip plates or the like either alone, in solution, suspension, or in the solid state as a film or powder.

By means of the described method according to this invention it is possible, as stressed above, to produce the same final product from various raw materials by means of one and the same process. The individual material groups undergo the following changes: Lignin-sulphonic acid is desulphonated by alkali hydroxide and changed into a water-insoluble fusible resin with concomitant decomposition. The insoluble and non-fusible wood-hydrolysis lignins are hydrolytically cleaved and decomposed and then also form a water-insoluble and fusible resin. With the raw materials containing mostly lignin besides carbohydrates, such as peat, the carbohydrates are changed into water-soluble decomposition products, the lignin being separated as a resin. The following remarks apply in connection with the reaction conditions to be adhered to in these processes.

The quantities of alkali and drying temperatures must be adapted to the final product desired. In this respect it is advisable, particularly for reasons of economy, to employ the minimum of alkali and a drying temperature which is as high as possible. If the quantity of alkali hydroxide employed is not sufficient and the heating temperature not high enough, the lignin is not sufficiently decomposed. It retains its high molecular weight and cannot be fused. In the case of lignin sulphonic acid there is the added fact that the desulphonation is not effected completely under conditions which are too mild, so that the lignin precipitates incompletely when the acid precipitation takes place subsequent to alkaline decomposition. On the other hand it is not advisable to decompose the lignin too drastically since a portion of the lignin would be destroyed or at least changed into water-soluble low-molecular-weight substances which largely remain in solution during the precipitation of the lignin, and greatly impair the technical application of lignin resin insofar as they are actually precipitated. Accordingly it is a characteristic of the best possible reaction conditions in every case, if lignin is obtained in maximum quantities and in a fusible condition.

If the heating temperature in the drying process is high, e. g. 200° centigrade and higher, there is the danger, in particular with the highly reactive lignin obtained in hydrolysis by means of hydrochloric acid, that the dried product ignites spontaneously. This may be avoided by adding less reactive alkaline substances, such as sodium carbonate or calcium oxide, to the decomposition solution. In such cases a thin salt layer forms on the surface of the dried material and prevents combustion. On the other hand the decomposition activity of the alkali hydroxide may not be high enough, as may be the case with highly condensed wood-hydrolysis lignins. In such a case the decomposition effect may be intensified by addition of lignin-dissolving substances, in particular phenols, or amines, alcohols, glycols, ketones or the like.

Apart from the adaptation of the decomposition agents to the raw material and the final product desired, the following measures are of importance.

1. Prior to decomposition it is advisable to steep the lignin-containing raw material as a fine powder uniformly with the alkali hydroxide solution. If there is a tendency on the part of the drying material to crust, said material will have to be worked in a very thin layer or with continuous stirring.

2. The lignin resin may be precipitated from the alkaline decomposition solution by means of strong or weak acids. Precipitation by means of strong acids does not impair the product. On the contrary, it is advisable to treat the resins precipitated by means of weak acids with strong acids, since the lignin resin may otherwise remain partially water-soluble.

3. The decomposed lignin is precipitated from a solution which is as concentrated as possible. Owing to the salt concentration then prevailing, a high yield of lignin resin is obtained and also the low-molecular-weight resin components are precipitated which are of importance for the fusibility of the resin obtained.

4. Precipitation may be effected at elevated temperature and the lignin is separated in a fused state. Thus excessive contamination of the lignin resin by inorganic salts may be avoided. Moreover, time-consuming filtering processes can be dispensed with.

It is a particular advantage of the method according to the invention that it permits of the preparation of mixtures of raw materials, in particular mixtures of fluid sulphite waste liquor and insoluble wood-hydrolysis lignin, peat or the like. Thus two purposes are achieved. First, the waste liquor may be used in its fluid state, the alkali hydroxide may be dissolved therein, and the pulverized, insoluble ligneous raw materials be steeped in this solution. On the other hand, the addition of insoluble materials to the waste liquor offers particular advantages. Above all, the evaporation rate of the waste liquor is substantially raised and crust formation avoided, so that the decomposition takes place in a fraction of the time required when sulphite waste liquor is used alone.

With regard to the apparatus required, the decomposition method according to this invention affords considerable advantages over the methods hitherto applied, since it permits of the use of simple apparatus which is available everywhere, avoids pressure vessels, and, above all, the process of decomposition may be effected continuously. In the event of the alkali-treated ligneous material forming a coherent mass while drying, a cylinder drier heated to approximately 200° centigrade surface temperature is advantageously used. In such a case, however, the material can be applied in a thin layer only. On the other hand, there is the possibility of pre-drying the material in a thicker layer on the cylinder drier, then crushing it and subsequently heating it to a higher temperature in a tunnel kiln. If the material forms a loose mass, a revolving tubular kiln, possibly with a ball charge, may be employed. The metallic heating surface of the drier is then suitably made of corrosion-proof material instead of iron so that the dried material does not stick to the surfaces.

A further particular advantage of the decomposition method according to the invention is deserving of special mention: a dense product results from the alkaline drying. This results in that the alkaline dried matter may be dissolved in a very high concentration, which fact affords the advantage, as aforementioned, that the lignin resin may be precipitated with a high yield.

If the lignin resin is precipitated from the alkaline solution by means of carbonic acid or sulphurous acid the waste liquors obtained may be used again. Precipitation by these gaseous acids may be effected by injecting the gases into the hot alkaline lignin solution. However, it is also possible to atomize the solution into a stream of the acid gas. When all the alkali hydroxide, for instance, sodium hydroxide, has been converted into the acid salts of the acids, a black lignin resin precipitates. The solution remaining after precipitation of said resin contains sodium bicarbonate and sodium bisulphite respectively and the low-molecular-weight sodium salts of the lignin decomposition products and carbohydrates. If quicklime is added to this solution and the lime slurry filtered off, the solution will contain a mixture of sodium hydroxide and organic sodium salts. When this solution is brought to the concentration required for the lignin decomposition by addition of fresh sodium hydroxide, it may be used for a further decomposition process without attendant disadvantage. By re-using the liquor, so much sodium hydroxide will in this case be saved as remained unused in the first lignin decomposition. If the waste liquor is repeatedly re-used in this manner, the organic sodium salts become concentrated in the liquors and progressively deleteriously affect decomposition. Eventually the entire waste liquor must be evaporated, roasted, dissolved in water, and causticized with quicklime; a cleaned sodium liquor is thus obtained which may again be reused in the decomposition process.

In the event that a part of the lignin components are retained in the waste liquors, as may be the case in the precipitation by means of carbonic acid, one may also proceed in such a manner that the inorganic sodium salts are allowed to crystallize out of the waste liquor, acidifying the solution obtained after separation of these salts. The lignin contained in the waste liquor is then precipitated as a thinly liquid resin.

The lignin resin precipitated by means of strong acids, or precipitated by means of weak acids and subsequently acidified, must be further treated in its moist state. Should it be completely dried, it will irreversibly lose the greater part of its fusibility and solvability in organic substances.

If it is desired to use the lignin resin as a heat-hardening binding agent, its fusibility and ability to be liquified may be increased by the addition of lignin-dissolving substances, such as alcohols, glycols, glycerin, glycerin esters, and other esters, ethers, ketones or the like. However, the addition of lignin-dissolving substances must not be too large, since the hardenability of the resins when heated may be impaired. In like manner lignin-dissolving and at the same time condensable substances, such as phenols, amines, amides or the like have similar effects, and they may be used in combination with aldehydes and ketones. Mixtures of polyvalent phenols, amines or amides are even more favourable, since they may condense with the lignin on the one hand, and with the aldehydes or ketones on the other. Even when added in small quantities, aldehydes alone, such as formaldehyde, hexamethylene tetramine, acetaldehyde, furfural and the like, effect an improvement in hardenability. The most favourable effects are obtained, however, if heat-hardening plastics are added, preferably in their initial condensation state. The lignin modified plastics thus obtained may replace the pure plastics in a large number of uses, such as in the manufacture of moulding compounds, ply-wood, laminated wood, fibre and chip plates and the like.

If alkaline-hardening plastics are being combined with the lignin resin, alkaline agents, such as alkali hydroxides, alkaline earth oxides, magnesium oxides or the like or mixtures of such substances must be added to the mixture prior to further operations.

However, if the lignin resin is used in conjunction with acid-hardening plastics, the solution obtained may be used as it is.

The method according to the invention, i. e. the method of mixing the raw materials with alkali hydroxide solution, of drying them with it, and of heating them, at least towards the end of the drying process, to temperatures above 100° centigrade, then of dissolving the dried material in water, finally precipitating the lignin resin by acidification, may be employed with particular advantage in the process of treating the waste liquors obtained in the decomposition of cellulose-containing materials.

Examples of application 1. 1000 grams finely-ground lignin obtained in wood hydrolysis with concentrated hydrochloric acid (Bergius Process) is thoroughly mixed with 400 grams of sodium hydroxide and 1000 grams of water, dried in a rotary tubular kiln with a steel-ball charge at 220° centigrade wall temperature, and heated until no more water escapes and a sample of the dried mixture is readily and completely soluble in water. The dried product is stirred into 2000 cubic centimetres of water and stirred while heating until all has dissolved. Stirring quite rapidly, 30% sulphuric acid is added to the lignin solution while at a temperature between 60° and 90° centigrade until a pH value of 3 is obtained. On precipitation, the lignin agglomerates in the solution and is fused together in the solution by further heating. The cooled lignin resin, which is separated from the solution, is then crushed and worked into a fine suspension with 350 cubic centimetres of water. This suspension is heated to boiling point and a purified lignin resin is thus obtained.

If it is desired to mix the lignin resin with e. g. a phenol formaldehyde resin, the process is as follows: A resin is produced by boiling 200 grams of phenol, 240 grams of 30% formaline and 1 gram of sodium hydroxide for two hours. Without separating the phenolic resin from the separated water, it is stirred when cold into the said lignin resin emulsion. The mixture is then heated, the lignin modified phenolic resin separates in its fused state, and the water is removed.

If it is desired to produce a moulding compound with the lignin resin described, the resin is mixed while being heated with 50 grams glycerine and 5 grams sodium hydroxide dissolved in 100 cubic centimetres of water, pouring the hot mixture in a heated kneader charged with 900 grams wood meal, 100 grams kaolin and 20 grams magnesium oxide. Now the material is kneaded at increasing temperature until a plastic mixture is obtained.

2. 1000 grams finely-ground Bergius lignin is mixed, as described under (1), with sodium hydroxide and heated. The dried material is dissolved in 2000 cubic centimetres of water, heated to a temperature of 60° centigrade, and a strong flow of carbonic acid in very fine distribution injected until the lignin is separated as a black resin and the solution has acquired a pH value of 8.5 The lignin resin is separated from the solution, suspended in water after crushing, then 30% sulphuric acid is added until a pH value of 3 is obtained. The liquor remaining after the carbonic acid precipitation is heated, and sufficient calcium oxide required for the transformation of the sodium bicarbonate added and the calcium carbonate precipitate filtered off after vigorous stirring. Then 180 grams sodium hydroxide is added to the thus regenerated liquor, which is then mixed with 1000 grams Bergius lignin, and the decomposition effected in the manner hereinabove described.

3. 1000 grams finely-ground Bergius lignin is decomposed with sodium hydroxide as described under (1). The lignin resin is precipitated by means of carbonic acid in the manner described under (2) and treated with mineral acid. The remaining liquor is evaporated in vacuo, fully dried subsequently and roasted until no organic substance remains. The residual salt deposit is taken up in water, calcium oxide being added to the solution, which is then filtered. The clear alkaline liquor is used for the decomposition of a further 1000 grams Bergius lignin after an addition of 125 grams sodium hydroxide.

4. 1000 grams finely-ground lignin obtained by wood hydrolysis by means of sulphuric acid is mixed with 500 grams sodium hydroxide, 1200 grams water and 50 grams phenol, dried in the rotary tubular kiln, heated, and the dried product is dissolved in 2500 cubic centimetres of water. On precipitation with mineral acids a fusible lignin is obtained and is worked up in accordance with Example 1.

5. 500 grams finely-ground peat is intimately mixed with a solution of 150 grams sodium hydroxide in 300 cubic centimetres of water. Then 100 grams 50% sulphite waste liquor is mixed with a solution of 200 grams sodium hydroxide in 200 cubic centimetres of water and the mixture is added to the peat treated with liquor. After prolonged mixing of all ingredients the paste-like material is placed on a cylinder drier from which the water quickly evaporates and on which a continuous layer is formed. This product is pulverized before it is quite free of water and dried in a rotary tubular kiln until completely dry and soluble, as described in Example 1. The dried product is dissolved in 1800 cubic centimetres of water, the solution heated to a temperature of 80° centigrade and saturated with sulphurous acid. The lignin resin is separated from the solution while hot, crushed after cooling, and then a fine suspension is produced with the addition of 500 cubic centimetres of water. Then 30% sulphuric acid is added until a low pH value is reached, and the lignin resin precipitated by heating the solution.

6. An alkali solution is prepared from 420 grams of sodium hydroxide and 400 grams of water, and added to 2000 grams 50% sulphite waste liquor and the resulting solution is completely dried in a thin layer on a cylinder drier heated by steam at a gauge pressure of 10 atmospheres. The dry thin layer of material is finely ground in a high-speed mill. The dried product is dissolved in 200 cubic centimetres of water, the lignin precipitated at 80° centigrade by means of sulphurous acid and separated from the solution. As described in Example 5, a suspension is made with 250 cubic centimetres of water, the lignin is acidified and fused by heating. If necessary, the lignin resin may again be suspended and fused by heating.

I claim:

1. The process of preparing fusible lignin resins from lignin, wood-hydrolysis lignin, lignin-sulphonic acid, sulphite waste liquor, peat and lignite, comprising mixing at least one of the said ligneous materials with sufficient alkali metal hydroxide in strong aqueous solution to react with all the lignin present, the proportions being of the order of 40 to 400 parts by weight of the alkali metal hydroxide per 100 parts by weight of lignin, heating the moist mixture to temperatures substantially above 100° C. but less than 200° C. to evaporate the moisture and to produce a dry residue substantially completely soluble in water, dissolving the said dry residue in water and adding mineral acid in an amount sufficient to precipitate fusible lignin resin.

2. The process according to claim 1 wherein the ligneous material comprises a mixture of the lignin residue derived from the acid hydrolysis of wood and lignin sulphonic acid in weight proportions of from 1:5 to about 1:10.

3. The process according to claim 1 wherein the alkali metal hydroxide is dissolved in sulphite cellulose waste liquor before being admixed with other ligneous material.

4. The process according to claim 1 wherein part of the alkali metal hydroxide is replaced by a compound taken from the group consisting of carbonates and oxides of the alkali and alkali earth metals.

5. The process according to claim 1, wherein a solubilizing agent for the lignin is added to the mixture of ligneous material and alkali metal hydroxide.

6. The process according to claim 1, wherein phenol is added as a solubilizing agent for the alkali reacted lignin, at about a ratio of 5 parts by weight per 100 parts by weight of lignin.

7. The process according to claim 1, wherein to the aqueous solution of the said dry residue gaseous carbonic acid is added to precipitate fusible lignin resin.

8. The process according to claim 1, wherein the aqueous solution of the said dry residue is saturated with gaseous sulphurous acid to precipitate fusible lignin resin.

9. The process according to claim 1, wherein the aqueous solution of the said dry residue is heated to a temperature between 60° to 90° C. while the said mineral acid is added.

10. The process according to claim 1, wherein the said moist mixture of ligneous material and alkali metal hydroxide is broken up during the drying to obtain the residue in form of a powder.

11. The process according to claim 1, wherein the said moist mixture of ligneous material and alkali metal hydroxide is initially dried under vacuum and thereafter under atmospheric pressure.

12. The process according to claim 1, wherein to the aqueous solution of the said dry residue 30 per cent sulphuric acid is added to precipitate fusible resin.

13. The process of preparing fusible lignin resins from lignin, wood-hydrolysis lignin, lignin-sulphonic acid, sulphite waste liquor, peat and lignite, comprising mixing at least one of the said ligneous materials with sufficient alkali metal hydroxide in strong aqueous solution to react with all the lignin present, the proportions being of the order of 40 to 400 parts by weight of the alkali metal hydroxide per 100 parts by weight of lignin, heating the moist mixture to temperatures substantially above 100° C. but less than 200° C. to evaporate the moisture and to produce a dry residue substantially completely soluble in water, dissolving the said dry residue in water, adding mineral acid in an amount sufficient to precipitate fusible lignin resin, separating the precipitated lignin resin from the liquid portion, subjecting the liquid portion to a lime treatment, separating the precipitate and mixing the remaining liquid with a new portion of one of the said ligneous materials.

14. The process according to claim 13, wherein the aqueous solution of the said dry residue is treated with a weak mineral acid and the precipitated lignin resin is separated from the liquid portion, broken up into small particles and suspended in water which is acidified to a pH of 3 by means of sulphuric acid.

15. The process according to claim 13, wherein the liquid portion remaining after the said acid treatment and the separation of precipitated lignin resin is evaporated in vacuo to a residue which, after drying and roasting to destroy organic impurities, is redissolved in water, in order to use the said aqueous solution, after a lime treatment and filtration, for the preparation of a new batch of fusible lignin resin from one of the said ligneous materials.

16. The process according to claim 13, wherein gaseous carbonic acid is used to precipitate lignin resin from the said aqueous solution of the residue, causing alkali metal salts to crystallize from the liquid portion remaining after the separation of precipitated lignin resin, separating the said crystallized salts and adding strong mineral acid to the remaining liquid to precipitate residual quantities of lignin resin.

References Cited in the file of this patent

UNITED STATES PATENTS

| Number | Name | Date |
|---|---|---|
| 1,977,728 | Leach | Oct. 23, 1934 |
| 2,099,717 | Alles | Nov. 23, 1937 |
| 2,379,889 | Dorland et al. | July 10, 1945 |
| 2,491,832 | Salvesen et al. | Dec. 20, 1949 |
| 2,559,305 | Mangold et al. | July 3, 1951 |